(12) United States Patent
Scroggie et al.

(10) Patent No.: US 7,698,787 B2
(45) Date of Patent: Apr. 20, 2010

(54) FASTENER

(75) Inventors: Derek Scroggie, Macomb, MI (US); Robert Osterland, East China, MI (US)

(73) Assignee: Illinois Tool Works Inc., Glenview, IL (US)

( * ) Notice: Subject to any disclaimer, the term of this patent is extended or adjusted under 35 U.S.C. 154(b) by 213 days.

(21) Appl. No.: 11/583,213

(22) Filed: Oct. 18, 2006

(65) Prior Publication Data

US 2007/0166127 A1      Jul. 19, 2007

Related U.S. Application Data

(60) Provisional application No. 60/759,889, filed on Jan. 18, 2006.

(51) Int. Cl.
A44B 1/04     (2006.01)

(52) U.S. Cl. .................. 24/297; 411/24; 411/32; 411/46; 411/508; 411/510; 411/913

(58) Field of Classification Search ............. 411/24, 411/32–33, 44–46, 508–510, 913; 24/297
See application file for complete search history.

(56) References Cited

U.S. PATENT DOCUMENTS

| | | | | |
|---|---|---|---|---|
| 2,758,498 A * | 8/1956 | Johnson | ...................... | 411/508 |
| 2,946,612 A * | 7/1960 | Ahlgren | ...................... | 292/17 |
| 3,037,596 A * | 6/1962 | Fordyce | ...................... | 52/511 |
| 3,040,401 A * | 6/1962 | Von Rath | ...................... | 24/297 |
| 3,093,874 A * | 6/1963 | Rapata | ...................... | 411/508 |
| 3,221,572 A * | 12/1965 | Swick | ...................... | 74/502.4 |
| 3,249,973 A * | 5/1966 | Seckerson | ...................... | 411/509 |
| 3,271,059 A * | 9/1966 | Pearson | ...................... | 411/509 |
| 3,272,059 A * | 9/1966 | Lyday et al. | ...................... | 411/510 |
| 3,309,955 A * | 3/1967 | Turnbull et al. | ...................... | 411/509 |
| 3,342,095 A * | 9/1967 | Buntic | ...................... | 411/508 |
| 3,412,437 A * | 11/1968 | Bennett | ...................... | 411/509 |
| 3,413,690 A * | 12/1968 | Pearson et al. | ...................... | 411/508 |
| 3,550,217 A * | 12/1970 | Collyer | ...................... | 411/509 |
| 3,568,311 A * | 3/1971 | Lawton | ...................... | 29/869 |
| 3,678,797 A * | 7/1972 | Seckerson | ...................... | 411/509 |
| 3,722,037 A * | 3/1973 | Jaeger | ...................... | 411/508 |
| 3,810,279 A * | 5/1974 | Swick et al. | ...................... | 411/509 |
| 3,860,999 A * | 1/1975 | Meyer | ...................... | 411/510 |
| 3,875,661 A * | 4/1975 | Lidstrom et al. | ...................... | 296/191 |
| 3,909,883 A * | 10/1975 | Fegen | ...................... | 174/138 D |

(Continued)

*Primary Examiner*—Victor Batson
*Assistant Examiner*—Roberta Delisle
(74) *Attorney, Agent, or Firm*—Mark W. Croll; Paul F. Donovan

(57) ABSTRACT

A w-base fastener includes multiple legs that compress towards a common member, to which the legs are attached, during the installation through an opening of a structure. These legs then engage the backside of the structure to which the fastener is mounted to hold the fastener in a mounted position within the opening. The fastener also includes a head or similar structure that permits items to be mounted to the fastener. The w-base fastener described herein also includes opposite flex arm features for thermal expansion for assembling moldings to a panel. Embodiments of the invention are used to provide for the ease of assembly, proper fit, and functional retention of moldings to structural panels, while also providing for the thermal expansion of the moldings. Aspects of the invention may be advantageously employed on automotive body side moldings including doors, rockers, wheel flares and other areas.

16 Claims, 2 Drawing Sheets

U.S. PATENT DOCUMENTS

| | | | |
|---|---|---|---|
| 4,122,583 A * | 10/1978 | Grittner et al. | 24/703.1 |
| 4,312,614 A * | 1/1982 | Palmer et al. | 411/44 |
| 4,405,272 A * | 9/1983 | Wollar | 411/41 |
| 4,422,276 A * | 12/1983 | Paravano | 52/511 |
| 4,495,380 A * | 1/1985 | Ryan et al. | 174/138 D |
| 4,639,175 A * | 1/1987 | Wollar | 411/38 |
| 4,648,766 A * | 3/1987 | Wollar | 411/41 |
| 4,674,931 A * | 6/1987 | Schwind et al. | 411/175 |
| 4,676,707 A * | 6/1987 | Cearlock et al. | 411/510 |
| 4,765,036 A * | 8/1988 | Iguchi et al. | 24/289 |
| 4,867,599 A * | 9/1989 | Sasajima | 403/338 |
| 5,028,190 A * | 7/1991 | Loughlin et al. | 411/182 |
| 5,046,223 A * | 9/1991 | Kraus | 24/453 |
| 5,288,189 A * | 2/1994 | Hepworth | 411/32 |
| 5,301,396 A * | 4/1994 | Benoit | 24/453 |
| 5,368,261 A * | 11/1994 | Caveney et al. | 248/73 |
| 5,507,610 A * | 4/1996 | Benedetti et al. | 411/339 |
| 5,536,125 A * | 7/1996 | Gaw, Jr. | 411/182 |
| 5,704,746 A * | 1/1998 | Leib et al. | 411/24 |
| 5,795,118 A * | 8/1998 | Osada et al. | 411/171 |
| 6,042,296 A * | 3/2000 | Wittig et al. | 403/298 |
| 6,581,252 B1 * | 6/2003 | Sedlock et al. | 24/297 |
| 6,594,870 B1 * | 7/2003 | Lambrecht et al. | 24/297 |
| 6,612,795 B2 * | 9/2003 | Kirchen | 411/508 |
| 6,715,185 B2 * | 4/2004 | Angellotti | 24/297 |
| 6,955,514 B2 * | 10/2005 | Hoshi | 411/508 |
| 6,979,162 B2 * | 12/2005 | Kato | 411/371.1 |
| 7,152,281 B2 * | 12/2006 | Scroggie | 24/297 |
| 7,165,371 B2 * | 1/2007 | Yoyasu | 52/716.5 |
| 2002/0028123 A1 * | 3/2002 | Miura et al. | 411/508 |
| 2002/0043041 A1 * | 4/2002 | Yoyasu | 52/716.5 |
| 2002/0131846 A1 * | 9/2002 | Kojima et al. | 411/508 |
| 2003/0159256 A1 * | 8/2003 | Clarke | 24/297 |
| 2003/0194288 A1 * | 10/2003 | Moerke et al. | 411/46 |
| 2004/0016088 A1 * | 1/2004 | Angellotti | 24/297 |
| 2004/0091334 A1 * | 5/2004 | Hoshi | 411/508 |
| 2004/0170488 A1 * | 9/2004 | Loi et al. | 411/387.2 |
| 2004/0175250 A1 * | 9/2004 | Yoneoka | 411/45 |
| 2004/0247410 A1 * | 12/2004 | Anscher et al. | 411/45 |
| 2004/0265094 A1 * | 12/2004 | Gordon | 411/508 |
| 2005/0079033 A1 * | 4/2005 | Benedetti et al. | 411/508 |

* cited by examiner

FASTENER

CROSS REFERENCE TO RELATED APPLICATIONS

This Non-Provisional Application claims benefit to U.S. Provisional Application Ser. No. 60/759,889 filed Jan. 18, 2006.

FIELD OF THE INVENTION

The present invention relates generally to fasteners or retainers, and more particularly, to w-base fasteners or retainers.

BACKGROUND OF THE INVENTION

It is known that fasteners or retainers are used in various applications to perform various functions. It is further known that numerous types of retainers or fasteners are used in various automotive applications. A common fastener that is widely used throughout a vehicle is known as a w-base or w-prong retainer or fastener (hereinafter "w-base fastener"). The w-base fastener type and its retaining scheme provide a simple yet effective solution to many fastening needs. As a result, this fastener is economical, functional, and widely accepted among the automotive industry.

Regardless of size or complexity, the w-base fastener utilizes some basic principles in fastening. These principles include multiple legs that compress towards a common member, of which the legs are attached, during the installation in a hole or opening. These legs then engage the backside of the hole to which the fastener is mounted to hold the fastener in a mounted position within the hole. The fastener also includes a head or similar structure that permits items to be mounted to the fastener. The w-base fastener provides an excellent method of retention with an outstanding insertion to extraction ratio.

Exemplary w-base fasteners or retainers are disclosed in U.S. Pat. Nos. 5,851,097, 5,797,714 and 6,715,185, all assigned to Illinois Tool Works Inc. Other known w-base fasteners include a single w-base feature on each side of the retainer base to allow for hole to hole applications only. Another known w-base fastener includes a bullhorn style attachment feature on one side of the retainer base.

SUMMARY OF THE INVENTION

The present invention is directed to, in an exemplary embodiment, a w-base fastener having features that take into account expansion or contraction of one mating member in relation to another so as to maintain a positive connection or engagement for both members. As explained herein, a certain amount of assembly float is provided in the overall assembly. However, it is not uncommon for one or more parts to be intentionally expanded or contracted beyond the allowable assembly float. Without the features of the present invention, if the molding flange or panel moves too far in one direction or another, the mating fastener could be damaged, forced out of the hole or otherwise caused to fail, thereby leading to the undesirable potential separation of the panel and molding flange or mating members. Because the fastener is configured to float beyond the assembly float amount, the fastener can stay centered in the mating holes over a greater area, thereby ensuring a desirable engagement between the panel and the molding flange.

A w-base fastener of an exemplary embodiment of the invention has opposite flex arm features that accommodate for thermal expansion of the mating members and for assembling the mating members. Embodiments of the invention are used to provide for the ease of assembly, proper fit, and functional retention of moldings to structural panels, for example, while also providing for the thermal expansion of the moldings. Aspects of the invention may be advantageously employed on automotive body side moldings including doors, rockers, wheel flares and other areas.

Other features and advantages of the invention will become apparent to those skilled in the art upon review of the following detailed description, claims and drawings, in which like numerals are used to designate like features.

Figure 1:
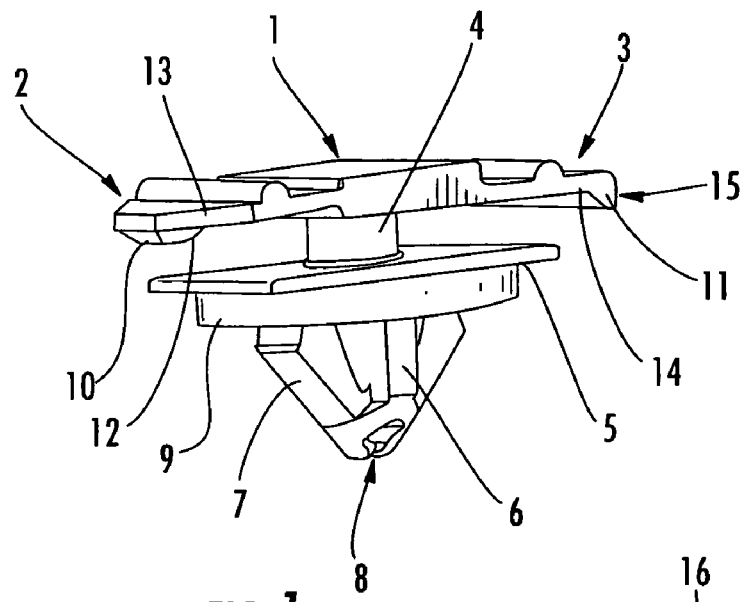
FIG. 1 is a perspective view of a w-base fastener according to an embodiment of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 2:
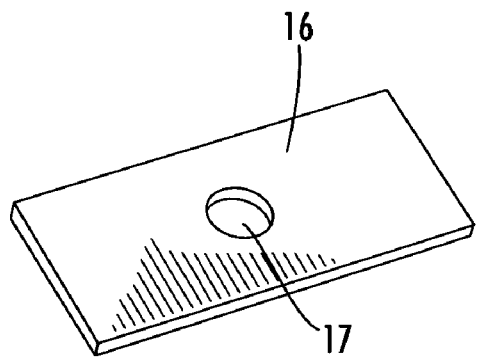
FIG. 2 is a perspective view of an exemplary mating sheet metal panel.

Referring to FIG. 1, an exemplary embodiment of the invention is a one piece molded fastener including a head 1 with a pair of opposite flex arms 2 and 3. Flex arm 2 includes a thermal expansion ramp 13 with a snap pad 10 disposed on the underside and at the end of the ramp 13. Flex arm 3 comprises a thermal expansion ramp 14 with a snap rail 11 disposed at the end, extending downward from the ramp 14, the snap rail 11 having an anti-load face 15 at the end of flex arm 3. A fastener neck 4 is substantially perpendicular to and extends downward from the head 1, and a collar 5 is disposed below and generally perpendicular to the neck. The collar 5 connects the neck 4 and a center post 6 and also functions as a back support for the set-up and compression of an optional foam seal 9. The center post 6 is disposed below and substantially perpendicular to the collar 5, providing the structural support for two legs 7 that are attached on opposing sides of the lower end of the center post 6. Each of the legs 7 extend upward at an acute angle with respect to the center post 6, and may flex relative to the post 6 by pressure exerted on the legs 7 by the edge of a hole 17 of a panel 16 during installation of the fastener. The panel 16 and hole 17 are shown in FIG. 2. To help facilitate the insertion of the upper end portions of the legs 7 through the panel hole 17, the upper ends may each be angled back toward the direction of the center post 6. As will be understood by those skilled in the art, the panel may be any type of panel or substrate to which a molding or other structure may be mounted. Additionally, the fastener may not only be made as a one-piece molded assembly, it may also be made of several component parts joined together.

The foam seal 9 is an optional feature disposed around the center post 6 and directly below the collar 5, functioning to protect against the intrusion of water, dirt, wind noise, and vapor into the hole 17. Disposed at the lower end of the center post 6 is the keyhole slot 8, which provides easier compression of the legs 7 when the fastener is being inserted into the hole 17. One function of the collar 5 is to halt the downward progress of the fastener when it is engaged in the hole 17, at a chosen depth through the panel 16. After passing through the hole 17, the legs 7 flex outward, creating an interference between the backside of the panel 16 and the legs 7. The portion of the fastener including the elements of the center post 6, legs 7, and keyhole slot 8 comprise what may be referred to as the w-base feature of the fastener. Following assembly, the fastener head 1 will contact the mounting flange 18, described below, creating a pull down force as the legs contact the backside of the panel 16, thereby securing the w-base fastener (and molding assembly) to the panel 16. The foam seal 9, if used, will contact the front side of the panel 16 while being supported by the collar 5 for the needed functional compression.

Figure 3:
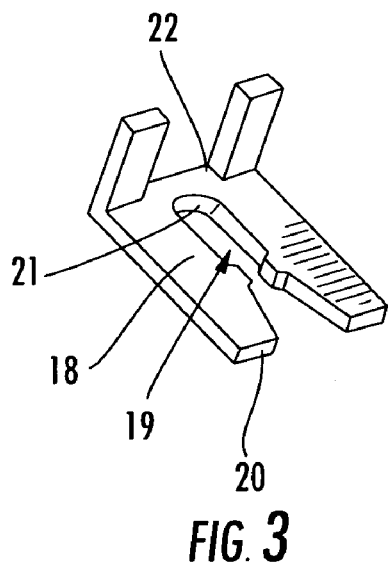
FIG. 3 is a perspective view of an exemplary molding flange.

FIG. 3 illustrates an exemplary mounting flange 18, or sometimes referred to as a dog-house, that may be assembled with the w-base fastener to a structural panel. The flange 18 includes an edge 20 with a keyway opening 19 through which the fastener neck 4 is loaded during mounting. The orientation of the fastener is such that the head 1 and collar 5 are retained on either side of the molding flange 18, with the protruding w-base construction of the fastener facing the hole 17 in the mating sheet metal panel 16. In an embodiment of the invention, the end of the thermal expansion ramp 13 on flex arm 2, and the snap pad 10 disposed underneath ramp 13, are designed to have approximately equal and sufficiently narrow widths to fit through an opening 22 at an end of the molding flange 18. The anti-load face 15 on the snap rail 11 at the end of the thermal expansion ramp 14 on flex arm 3, in contrast, has a width greater than that of flange opening 22, thus preventing the w-base fastener from being attached to the flange in the incorrect, opposite orientation. To increase the ease of assembling the fastener to the molding flange 18, a lead-in ramp 12 on the snap pad 10 may ride up the flange edge 21 as the parts are mounted together. In addition to the aspects described above, the mounting flange 18 may define other suitable flange configurations.

Figure 4:
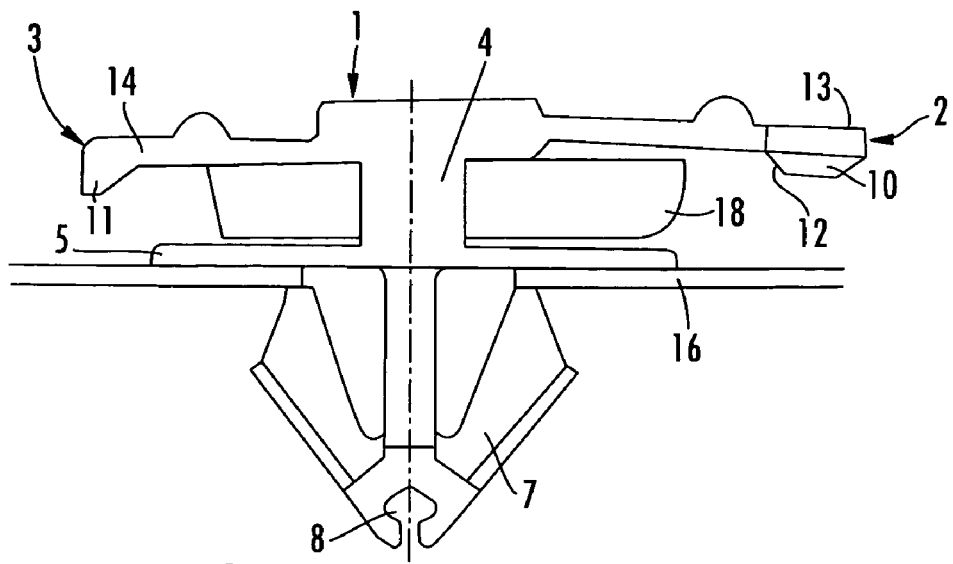
FIG. 4 is a side elevation view of a w-base fastener mounted to a molding flange and a panel, according to an embodiment of the invention.

As illustrated in the embodiment shown in FIG. 4, the thermal expansion ramps 13 and 14 provide for the fastener to maintain its proper connection to the molding flange 18 while allowing for a predetermined amount of float. The difference between the length of the molding flange 18 and the distance between the snap rail 11 and snap pad 10 will determine the approximate amount of float for a particular embodiment. The float may be beneficial for maintaining the assembled position of the w-base fastener with the flange 18, for example during shipping to an assembly plant. An amount of float may also aid the process of locating the hole 17 in the panel 16 with the lower end of the fastener. The design of the legs 7, which form a generally arrow-like shape that points downward, may be beneficial for locating of the hole 17, which is sometimes difficult to visually locate.

Figure 5:
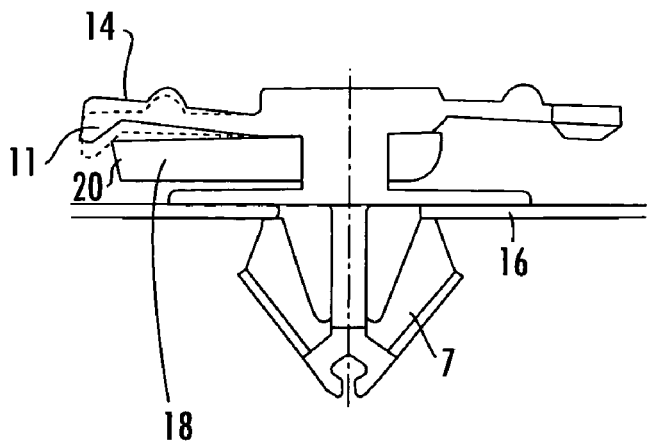
FIG. 5 is a side elevation view of a w-base fastener mounted to a molding flange and a panel, according to an embodiment of the invention, illustrating molding expansion movement in a direction to the left.
Figure 6:
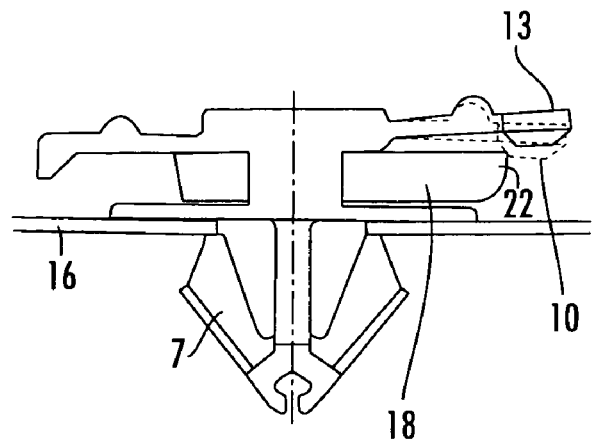
FIG. 6 is a side elevation view of a w-base fastener mounted to a molding flange and a panel, according to an embodiment of the invention, illustrating molding expansion movement in a direction to the right.

Referring to the embodiment illustrated in FIG. 5, the thermal expansion ramp 14 allows the snap rail 11 to disengage from flange edge 20 in the direction of thermal expansion from the molding when needed. In the illustration of FIG. 5, the thermal expansion is depicted as being in the direction to the left. In an aspect of the invention shown in FIG. 6, the thermal expansion ramp 13 allows the snap pad 10 to disengage from flange edge 22 in the direction of thermal expansion from the molding when needed. In the illustration of FIG. 6, the thermal expansion is depicted as being in the direction to the right. The inclusion of thermal expansion ramps 13, 14, or both, may result in a w-base fastener that maintains effective connection of the flange 18 and panel 16 over a wider range of thermal conditions than possible with known fastener designs.

Aspects of the invention may provide a number of functions. For example, the two flex arms 13, 14 may hold the w-base fastener in the proper position for final assembly to the sheet metal panel 16 while allowing for the needed float of the fastener within the molding flange 18 to self-locate the hole in the panel. The narrow snap pad allows for the assembly of the fastener through the keyway opening with the loading ramp riding up the molding flange for assembly, while the snap rail feature allows for the engagement of the thermal expansion ramp to the molding flange out beyond the keyway opening. In addition, the anti-load face 15 feature assures that the fastener will not be loaded backwards onto the molding flange. By incorporating the flex feature onto the head portion of the retainer, the fastener allows for the designed environment set-up height, which is the height between the underside of the molding flange and the top side of the mating panel, to be at a minimum packing condition.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A w-base fastener comprising:
   a head with a first flex arm and a second flex arm disposed opposite of each other, the first flex arm including a first thermal expansion ramp with a snap pad disposed on the underside and at the end of the first ramp and the second flex arm including a second thermal expansion ramp with a snap rail disposed at the end extending downward from the second ramp, the rail having an anti-load face;
   a neck extending downwardly from the head;
   a collar disposed below the neck, the collar having a length;
   a center post extending downwardly from the collar and defining a lower end; and
   a first leg and a second leg, the legs attached on opposing sides of the lower end of the center post and each extending upwardly at an acute angle with respect to the center post;

wherein the first flex arm and the second flex arm maintain a connected position of the fastener with respect to a flange and a panel during thermal expansion, and wherein the flange has a flange length that is less than a second length defined as a distance between the snap pad and the snap rail, the second length also being greater than the length of the collar, such that a difference between the flange length and the second length defines an approximate amount of float between the fastener, the flange and the panel, and such that during thermal expansion in one direction beyond the approximate amount of float, the first flex arm flexes and the snap pad disengages from a mating member, and such that during thermal expansion in an opposite direction beyond the approximate amount of float, the second flex arm flexes and the snap rail disengages from another mating member.

2. The w-base fastener of claim 1 further comprising a keyhole slot disposed at the lower end of the center post.

3. The w-base fastener of claim 2 further comprising a foam seal disposed around the center post.

4. The w-base fastener of claim 3 wherein the collar provides support for the compression of the foam seal.

5. The w-base fastener of claim 4 wherein the legs compress towards each other and the central post at a time when the fastener is inserted into a panel hole, and the legs engage a backside of the panel following insertion into the panel hole.

6. The w-base fastener of claim 1 wherein the first expansion ramp snap pad further comprises a lead-in ramp.

7. The w-base fastener of claim 2 wherein the fastener is mountable to molding flange that defines a molding flange opening.

8. The w-base fastener of claim 7 wherein the snap pad disengages from an opening of the molding flange in the direction of thermal expansion.

9. The w-base fastener of claim 7 wherein the snap rail disengages from an edge of the molding flange in the direction of thermal expansion.

10. The w-base fastener of claim 2 wherein the first flex arm and the second flex arm maintain the fastener mounted to a molding flange.

11. A w-base fastener mountable to a molding and a panel, wherein the molding defines a molding flange with an opening and the panel includes a hole, the fastener comprising:

a head with a first flex arm and a second flex arm, the arms extending opposite from each other; the first flex arm comprising a first thermal expansion ramp with a snap pad disposed underneath and at the end of the ramp, the snap pad having a width approximately equal to the width of the end of the ramp and less than the width of an opening of the molding; the second flex arm comprising a second thermal expansion ramp with a snap rail disposed underneath and at the end of the second ramp;

a neck extending downwardly from the head;

a collar disposed below the neck, the collar having a length; and a w-base feature extending downwardly from the collar;

wherein the first flex arm and the second flex arm maintain the fastener mounted to the molding flange and the panel during thermal expansion, and wherein the molding flange has a flange length that is less than a second length defined as a distance between the snap pad and the snap rail, the second length also being greater than the length of the collar, such that a difference between the flange length and the second length defines an approximate amount of float between the fastener, the molding flange and the panel, and such that during thermal expansion in one direction beyond the approximate amount of float, the first flex arm flexes and the snap pad disengages from the molding flange opening, and such that during thermal expansion in the opposite direction beyond the approximate amount of float, the second flex arm flexes and the snap rail disengages from an edge of the molding flange.

12. The w-base fastener of claim 11 further comprising a foam seal disposed around the center post and adjacent to the collar.

13. The w-base fastener of claim 12 wherein the collar provides support for the compression of the foam seal.

14. The w-base fastener of claim 11 wherein the first expansion ramp snap pad further comprises a lead-in ramp.

15. The w-base fastener of claim 11 wherein the first flex arm and the second flex arm maintain the fastener mounted to the molding flange and allow float for the w-base feature to be inserted into the hole of the panel.

16. The w-base fastener of claim 11 wherein the snap rail maintains the mounting of the fastener to the molding flange during shipment and assembly to the panel.

* * * * *